US010245560B2

(12) United States Patent
Mukherjee et al.

(10) Patent No.: US 10,245,560 B2
(45) Date of Patent: Apr. 2, 2019

(54) FILTRATION AND REUSE OF SURFACTANT-CONTAINING PRODUCED WATER FOR OIL RECOVERY

(71) Applicants: Dow Global Technologies LLC, Midland, MI (US); Rohm and Haas Company, Collegeville, PA (US)

(72) Inventors: Joydeep Mukherjee, Missouri City, TX (US); Supriyo Das, Tarragona (ES); Wanglin Yu, Pearland, TX (US); Claribel Acevedo Velez, Houston, TX (US); Peter M. Rozowski, Bellaire, TX (US); Susan K. Falcone-Potts, Clute, TX (US)

(73) Assignees: Dow Global Technologies LLC, Midland, MI (US); Rohm and Haas Company, Midland, MI (US)

( * ) Notice: Subject to any disclaimer, the term of this patent is extended or adjusted under 35 U.S.C. 154(b) by 0 days.

(21) Appl. No.: 15/767,469

(22) PCT Filed: Nov. 6, 2015

(86) PCT No.: PCT/IB2015/002232
§ 371 (c)(1),
(2) Date: Apr. 11, 2018

(87) PCT Pub. No.: WO2017/077355
PCT Pub. Date: May 11, 2017

(65) Prior Publication Data
US 2018/0296985 A1 Oct. 18, 2018

(51) Int. Cl.
C02F 1/44 (2006.01)
B01D 69/10 (2006.01)
B01D 69/12 (2006.01)
C09K 8/584 (2006.01)
E21B 43/38 (2006.01)

(52) U.S. Cl.
CPC ............ B01D 69/125 (2013.01); C02F 1/444 (2013.01); C09K 8/584 (2013.01); B01D 69/10 (2013.01); E21B 43/38 (2013.01)

(58) Field of Classification Search
None
See application file for complete search history.

(56) References Cited

U.S. PATENT DOCUMENTS

| | | | |
|---|---|---|---|
| 3,945,437 | A | 3/1976 | Chiu et al. |
| 4,013,569 | A | 3/1977 | Chui et al. |
| 4,532,051 | A | 7/1985 | Nuckels Nee Byth et al. |
| 4,739,831 | A | 4/1988 | Settlemeyer et al. |
| 5,013,462 | A | 5/1991 | Danley |
| 5,203,411 | A | 4/1993 | Dawe et al. |
| 6,581,687 | B2 | 6/2003 | Collins et al. |
| 8,261,919 | B2 | 9/2012 | Burr et al. |
| 9,926,211 | B2 | 3/2018 | Liu et al. |
| 2008/0200351 | A1 | 8/2008 | Dahanayake et al. |
| 2010/0051538 | A1 | 3/2010 | Freeman et al. |
| 2011/0174485 | A1 | 7/2011 | Robb et al. |
| 2012/0101010 | A1 | 4/2012 | Weerasooriya et al. |
| 2014/0262254 | A1 | 9/2014 | Smith |
| 2014/0263057 | A1 | 9/2014 | Smith et al. |
| 2015/0034555 | A1 | 2/2015 | Speirs et al. |
| 2016/0102006 | A1 | 4/2016 | Blumenschein |
| 2016/0221842 | A1* | 8/2016 | Rau, III ............... C02F 1/40 |
| 2016/0229723 | A1* | 8/2016 | Olivier ............... C02F 1/5236 |
| 2016/0304363 | A1 | 10/2016 | Roy et al. |

FOREIGN PATENT DOCUMENTS

WO 2010006196 1/2010

OTHER PUBLICATIONS

Casiraghi A., Selmin F., Minghetti P., Cilurzo F., Montanan L. (2015) Nonionic Surfactants: Polyethylene Glycol (PEG) Ethers and Fatty Acid Esters as Penetration Enhancers. In: Dragicevic N., Maibach H. (eds) Percutaneous Penetration Enhancers Chemical Methods in Penetration Enhancement. Springer, Berlin, Heidelb.*

* cited by examiner

Primary Examiner — Krishnan S Menon

(57) ABSTRACT

A method for recovering oil from an oil bearing formation including the steps of: i) recovering an oil-water mixture from the oil-bearing formation; ii) separating at least a portion of the oil from the oil-water mixture to form a produced water; iii) adding a polymeric alkylene oxide surfactant having a Mw of less than 10000 Da to the produced water; iv) passing the produced water through a polymeric membrane to form a permeate stream and a retentate stream; and v) injecting the permeate stream into the oil bearing formation.

9 Claims, No Drawings

FILTRATION AND REUSE OF SURFACTANT-CONTAINING PRODUCED WATER FOR OIL RECOVERY

FIELD

The invention is directed toward oil and gas recovery methods involving the injection of an aqueous mixture including surfactants into an oil bearing formation for the purpose of improving oil recovery.

INTRODUCTION

Techniques for secondary and enhanced oil recovery such as water and chemical flooding involve the injection of an aqueous mixture down an injection well into oil bearing (e.g. subterranean reservoir) formation. The aqueous mixture often includes one or more of surfactants, scale-inhibitors, corrosion inhibitors, asphaltene inhibitors, viscosity agents, biocides, proppants, etc. See for example: U.S. Pat. No. 3,945,437, U.S. Pat. No. 4,013,569, U.S. Pat. No. 4,532,051, U.S. Pat. No. 4,739,831, U.S. Pat. No. 5,013,462, U.S. Pat. No. 5,203,411, U.S. Pat. No. 6,581,687, US2011/0174485 and US2012/0101010. The producing wells produce the reservoir fluids that comprise hydrocarbons (oil and gas) along with the water from the formations. After the oil and gas is separated from the mixture, the residual water mixture, referred to as "produced water," may be treated and reused in subsequent injection of the aqueous mixture in the injection operations. See US2008/0200351, US2014/0262254 describes process wherein an oil-water mixture is recovered from a well. Oil is separated from the recovered mixture and the residual produced water is pretreated to remove hardness and other scale forming compounds by precipitation. The pretreated produced water may still contain small amounts of oil in addition to solids and salts that may adversely affect water flooding operations. Such produced water may then be filtered by ceramic filters to produce: i) a retentate stream including contaminates, e.g. suspended solids, hardness and oil, and ii) a permeate stream relatively free of such contaminates. The permeate stream may then be subject to chemical treatments, e.g. addition of surfactants, alkali compounds, etc., and is reused as injection water for improving waterflooding operations. Unfortunately, the use of ceramic membranes for treating oil containing produced water adds to the cost and complexity of the process. Polymeric membranes are a lower cost option and can filter out the suspended solids and reduce salt content in treated water. Polymeric membranes have limited utility in treating oil containing produced water, given their propensity to foul in the presence of oil. Although chemical cleaning of polymeric membranes may be employed to remove the oil fouling of the membrane, such cleaning process may render the treatment process quite expensive due to high operating costs from periodic chemical treatment. Moreover for maintain a steady flow of treated water, many such parallel units may be required to be installed in oil field facilities. Lower cost alternatives methods for treating produced water are desired.

SUMMARY

The present invention includes a method for recovering oil from an oil bearing formation including the steps of: i) recovering an oil-water mixture from the oil-bearing formation; ii) separating at least a portion of the oil from the oil-water mixture to form a produced water (e.g. the produced water preferably has from 1 to 10000 ppm of oil, and more typically from 100 to 5000 ppm); iii) adding a polymeric alkylene oxide surfactant having a Mw of less than 10000 Da to the produced water; iv) passing the produced water through a polymeric membrane to form a permeate stream and a retentate stream; and v) injecting the permeate stream into the oil bearing formation.

In a preferred embodiment, the membrane is treated with a surfactant that reduces membrane fouling due to oil present in the produced water and the same surfactant also improves the performance of treated water in the downhole injection bore by enhancing injectivity of the water in the oil bearing formation. The surfactant is selected both upon its ability to condition (i.e. "wet") the membrane with water and to largely pass through the membrane to be present in the resulting permeate stream which is used for injection water for affecting an improvement in water flooding operation by improved injectivity of treated water and increasing recovery of oil from the oil bearing formation by making the formation more water wet. A variety of embodiments are described.

DETAILED DESCRIPTION

The membranes used in the present invention may be characterized as ultrafiltration membranes due to their preferred average pore size of from 0.01 to 0.1 μm. While the membranes may be fabricated into a variety of configurations, (e.g. flat sheet, hollow fiber, tubular, etc.), a hollow fiber configuration is preferred. The hollow fiber membranes are preferably assembled within a filter module including a tubular-shaped housing extended along an axis between an opposing first and second end with an inner chamber. The housing may be constructed from a wide variety of materials, e.g. plastics, ceramics, metals, etc., however, in one set of preferred embodiments the housing is made from an injection moldable plastic such as polyvinyl chloride (PVC) or acrylonitrile butadiene styrene (ABS). The module includes a plurality (e.g. hundreds) of semi-permeable hollow fiber membranes ("fibers") located within the inner chamber. The fibers include a semi-permeable wall surrounding a lumen which extends between an opposing first and second end. The fibers are preferably axially aligned with their first ends located adjacent to a first end of the housing and their second ends located adjacent to the second end of the housing. In an alternative embodiment, both ends of the fibers are located at a common end of the housing with the bulk of the fiber extending between the opposing ends of the housing in a classic "U" shaped configuration Representative semi-permeable hollow fiber membranes include those made from: cellulose acetate, polysulfones, polyether sulfones, polyvinylidene fluoride, polyamides, polyacrylonitrile, polypropylene, poly vinyl chloride etc., but polyvinylidene fluoride is preferred.

One or both of the opposing ends of the fibers may be sealed from the inner chamber as part of a tubesheet. The tubesheet may be formed by well-known "potting" techniques (e.g. using epoxy, polyurethane, silicone, etc.) wherein one or both ends of the hollow fibers remain open and in fluid communication with one or more outer chambers formed within an end cap assembly. See for example U.S. Pat. No. 8,506,808 and the references cited therein. In an alternative embodiment, one end of the fibers forms part of a tubesheet with the opposing fiber ends are individually sealed in a manner that allows individual fibers to be free to move relative to another. In yet another embodiment, both ends of the fibers are sealed within a common tubesheet with the bulk of the fiber extending between the opposing ends of the housing in a classic "U" shaped configuration.

In operation, pressurized feed fluid enters the module via an inlet located at one end of the module. Fluid passing through the walls of the hollow fiber membrane ("permeate") and entering into the fiber's lumen exits the module by way of a separate fluid port, typically located at the opposite end of the module from where feed fluid enters. Fluid not passing through the walls of the membrane exits the module as "concentrate" (also referred to as "retentate"). Examples of such modules include: DOW™ Ultrafiltration module models: SFP-2860, SFP-2880, SFD-2860 and SFD-2880 available from the Dow Chemical Corporation. Additional examples are described in U.S. Pat. No. 8,261,919.

While not particularly limited, the polymers from which the membranes are prepared from are hydrophobic. Due to their hydrophobic nature, membranes made from such polymers have been traditionally been poorly suited for use with oil containing water, due to their propensity to attract oil and become fouled. In the present invention, the membrane is treated with a surfactant that reduces membrane fouling due to oil present in the produced water. The surfactant is selected both upon its ability to condition (i.e. "wet") or render the polymer membrane more hydrophilic and to largely pass through the membrane to be present in the resulting permeate stream which is used for injection water. The same surfactant the improves oil recovery from the oil bearing formation by enhancing the injection rate of treated water in the well-bore region of the injection well and by making the formation more water wet. In order to pass through the membrane, the surfactants preferably have a Mw less than 10000 (Dalton), and more preferably less than 5000, (e.g. from 200 to 5000, and more preferably from 500 to 3000). In order to adequately "wet" the membrane, alkylene oxide surfactants are preferred.

The surfactants may be anionic, cationic, zwitterionic, or non-ionic but preferably non-ionic. The surfactants are also preferably water soluble and their hydrophobes may be branched or linear. Preferred surfactants include at least 40 wt %, 50 wt % and in some embodiments even 85 wt % of alkylene oxide groups. The term "alkylene oxide" is used interchangeable with the term "oxyalkylene" and both collectively refer to units having the structure:

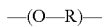

wherein O—R represents the monomeric residue of the polymerization reaction product of a $C_{2-4}$ alkylene oxide. Examples include but are not limited to: oxyethylene with the structure —(OCH$_2$CH$_2$)—; oxypropylene with the structure —(OCH(CH$_3$)CH$_2$)—; oxytrimethylene with the structure —(OCH$_2$CH$_2$CH$_2$)—; and oxybutylene with the general structure —(OCH(CH$_2$CH$_3$)CH$_2$)— or —(OC$_4$H$_8$)—. Polymers containing these units are often referred to an "polyoxyalkylenes." The polyoxyalkylene units can be homopolymeric or copolymeric. Examples of homopolymers of polyoxyalkylenes include, but are not limited to polyoxyethylene, which contains units of oxyethylene; polyoxypropylene, which contains units of oxypropylene; polyoxytrimethylene, which contains units of oxytrimethylene; and polyoxybutylene, which contains units of oxybutylene. Examples of polyoxy butylene include a homopolymer containing units of 1,2-oxybutylene, —(OCH(C$_2$H$_3$)CH$_2$)—; and polytetrahydrofuran, a homopolymer containing units of 1,4-oxybutylene, —(OCH$_2$CH$_2$CH$_2$CH$_2$)—. Alternatively the polyoxyalkylene segments can be copolymeric, containing two or more different oxyalkylene units. The different oxyalkylene units can be arranged randomly to form a random polyoxyalkylene; or can be arranged in blocks to form a block polyoxyalkylene. Block polyoxyalkylene polymers have two or more neighboring polymer blocks, wherein each of the neighboring polymer blocks contain different oxyalkylene units, and each polymer block contains at least two of the same oxyalkylene units. Oxyethylene is the preferred oxyalkylene segment. The subject polymeric surfactant preferably includes a plurality of oxyalkylene segments or blocks having a Mw of from 100 to 1000. In one preferred embodiment, the surfactant comprises at least 5 alkylene oxide repeating units, and more preferably from 5 to 20 alkylene oxide repeating units. A preferred class of surfactants is represented by the formula:

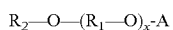

wherein: $R_1$ is selected from an alkyl or alkenyl group preferably having from 1 to 4 carbon atoms, $R_2$ is selected from a hydrogen or hydrocarbon group (e.g. aliphatic groups including alkyl, alkenyl, and aromatic groups including aryl, arylalkyl and alkylaryl) having from 1 to 20 carbon atoms which may be straight or branched, saturated or unsaturated, and may include ring structures, x is an integer of ≥5, e.g. preferably from 5 to 20, and A is selected from hydrogen, $C_1$-$C_4$ alkyl, chlorine amine, phosphate and sulfate or salts thereof. In a preferred sub-set of embodiments, A is hydrogen, and $R_1$ and $R_2$ are independently selected from alkyl groups.

Preferred surfactants have cloud points above 30° C., 50° C., 80° C., 90° C. and in some instances 100° C. The cloud point is the temperature above which an aqueous solution of a water-soluble surfactant becomes turbid indicating separation of the surfactant phase from aqueous phase. Wetting, cleaning and foaming characteristics can be different above and below the cloud point. Cloud points are measured using 1% aqueous surfactant solutions. Cloud points typically range from 0° to 100° C., limited by the freezing and boiling points of water. Cloud points are characteristic of nonionic surfactants indicating the instability of the surfactant mixture in water. The phase stability may be increased by adding a second component (surfactant or hydrotrope) with higher cloud point. The second surfactant may be a non-ionic surfactant with large number of ethylene oxide (>20) groups or anionic surfactants (with negatively charged groups) that are typically more water-soluble at elevated temperatures. Such secondary surfactants can be used in conjunction with above mentioned wettability altering non-ionic surfactants in order to elevate the cloud points to desired levels as required for effecting a change in the wettability of the polymeric membrane fibers as well as that of the rock formation. A preferred an anionic surfactant (second surfactant) is represented by:

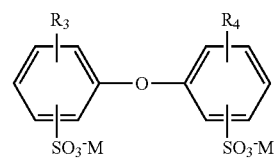

$R_3$ and $R_4$ are each independently selected from a group consisting of hydrogen and linear and branched alkyl groups with one to 16 carbons; and M is selected from sodium, potassium, lithium and ammonium.

Preferred surfactants include the TERGITOL™ 15-S Series (e.g. TERGITOL™ 15-S-12 and 15-S-15) nonionic surfactants available from The Dow Chemical Company.

Preferred anionic surfactants for improving phase behavior of the non-ionic surfactants are DOWFAX™ series (e.g. DOWFAX™ 8390 DOWFAX™ C6L, DOWFAX™ 2A1, etc.)

The polymeric alkylene oxide surfactant is preferably added to produced water to form a concentration of from 0.0001 to 10% by volume, more preferably from 0.01 to 1.0% by volume, and further more preferred 0.05 to 1.0% by volume.

As previously mentioned, the present method involves the sequential steps of: i) recovering an oil-water mixture from the oil-bearing formation; ii) separating at least a portion of the oil from the oil-water mixture to form a produced water (e.g. by using a free water knockout drum, heater treaters, gravity separators, API separators, CPI separators, air flotation separators, induced air flotation, etc.); iii) adding a polymeric alkylene oxide surfactant to the produced water; iv) passing the produced water through a polymeric membrane form a permeate stream and a retentate stream; and v) injecting the permeate stream into the oil bearing formation. The method may include additional intermediate steps. For example, the produced water may be pre-treated prior to the addition of surfactant, e.g. removal of hardness and scale forming materials, silica precipitation, emulsified oil, etc. Similarly, after the passing through the polymeric membrane, the retenate (and is some cases the permeate) stream may be subjected to additional treatments steps, e.g. ion exchange (e.g. WO2015/020746), evaporation, emulsification, de-aeration, advanced oxidation, reverse osmosis and nanofiltration (e.g. WO2015/105632). The method may further include the addition of various additives (e.g. phase stabilizing surfactants, scale-inhibitors, corrosion inhibitors, emulsifiers, asphaltene inhibitors, viscosity agents, biocides, proppants, deformers, etc.) at various points throughout the process. However, it will be appreciated that the permeate stream should not be subject to additional treatment that would remove the bulk of the polymeric alkylene oxide surfactant added to the produced water prior to passing the produced water through the polymeric membrane.

The invention claimed is:
1. A method for recovering oil from an oil bearing formation comprising:
   i) recovering an oil-water mixture from the oil-bearing formation;
   ii) separating at least a portion of the oil from the oil-water mixture to form a produced water;
   iii) adding a polymeric alkylene oxide surfactant having a Mw of less than 10000 Da to the produced water;
   iv) adding a second surfactant to the produced water, wherein the second surfactant is represented by:

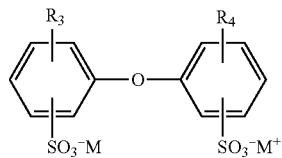

wherein: $R_3$ and $R_4$ are each independently selected from a group consisting of hydrogen and linear and branched alkyl groups having from 1 to 16 carbons; and M is selected from sodium, potassium, lithium and ammonium;
   v) passing the produced water through a polymeric membrane form a permeate stream and a retentate stream; and
   vi) injecting the permeate stream into the oil bearing formation.

2. The method of claim 1 wherein the polymeric membrane has an average pore size of from 0.01 to 0.1 µm.

3. The method of claim 1 wherein the surfactant has a Mw of from 200 to 5000.

4. The method of claim 1 wherein the surfactant comprises at least 5 alkylene oxide repeating units.

5. The method of claim 1 wherein the surfactant comprises from 5 to 20 alkylene oxide repeating units.

6. The method of claim 1 wherein the surfactant has a cloud point based upon a 1 wt % solution of greater than 30° C.

7. The method of claim 1 wherein the surfactant has a cloud point based upon a 1 wt % solution of greater than 80° C.

8. The method of claim 1 wherein the surfactant is nonionic.

9. The method of claim 1 wherein the surfactant is represented by:

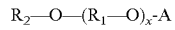

wherein: $R_1$ is selected from an alkyl or alkenyl group, $R_2$ is selected from a hydrogen or hydrocarbon group, x is an integer $\geq 5$, and A is selected from hydrogen, C1-C4 alkyl, chlorine, amine, phosphate and sulfate or salts thereof.

* * * * *